United States Patent [19]

Newman et al.

[11] Patent Number: 5,250,355

[45] Date of Patent: Oct. 5, 1993

[54] ARC HARDFACING ROD

[75] Inventors: Harold C. Newman; Harold E. Kelley, both of Fallon, Nev.

[73] Assignee: Kennametal Inc., Latrobe, Pa.

[21] Appl. No.: 808,837

[22] Filed: Dec. 17, 1991

[51] Int. Cl.5 .............................................. D02G 3/00
[52] U.S. Cl. ................................. 428/367; 219/146.1; 219/146.51; 428/376; 428/384; 428/387; 428/375
[58] Field of Search ............... 428/367, 387, 376, 375, 428/379, 380, 383, 384, 389; 219/146.1, 146.51; 75/236, 237, 253, 254, 255

[56] References Cited

U.S. PATENT DOCUMENTS

| | | | |
|---|---|---|---|
| 1,793,157 | 2/1931 | Chapin | 75/254 |
| 2,002,198 | 5/1935 | Wissler | 219/10 |
| 2,002,462 | 5/1935 | Woods | 219/8 |
| 2,021,628 | 11/1935 | Larson | 428/387 |
| 2,180,813 | 11/1939 | Marvin | 219/8 |
| 2,280,223 | 4/1942 | Dumpelmann et al. | 219/8 |
| 2,507,195 | 5/1950 | Colbeck et al. | 219/146.51 |
| 2,806,129 | 9/1957 | Cape | 75/254 |
| 3,023,130 | 2/1962 | Wasserman et al. | 117/205 |
| 3,109,917 | 11/1963 | Schmidt et al. | 219/76 |
| 3,231,709 | 1/1966 | Foley, Jr. | 219/76 |
| 3,252,828 | 5/1966 | Quaas | 117/207 |
| 3,291,653 | 12/1966 | Eilers | 148/12.1 |
| 3,329,487 | 7/1967 | Sowko et al. | 29/182.7 |
| 3,334,975 | 8/1967 | Quaas et al. | 29/191.6 |
| 3,398,256 | 8/1968 | Foley, Jr. | 219/146 |
| 3,398,257 | 8/1968 | Wiehe | 219/146 |
| 3,583,471 | 6/1971 | Kemming | 164/97 |
| 3,627,979 | 12/1971 | Quaas | 219/146 |
| 3,768,984 | 10/1973 | Foster, Jr. | 29/182.8 |
| 3,972,108 | 8/1976 | Ericson et al. | 29/420.5 |
| 4,055,742 | 10/1977 | Brown et al. | 219/145 |
| 4,162,392 | 7/1979 | Brown et al. | 219/146.51 |
| 4,312,894 | 1/1982 | Brown et al. | 427/34 |
| 4,451,508 | 5/1984 | Brown | 427/423 |
| 4,666,797 | 5/1987 | Newman | 75/252 |
| 4,699,848 | 10/1987 | Maybon | 428/560 |
| 4,726,432 | 2/1988 | Scott et al. | 175/375 |
| 5,051,112 | 9/1991 | Keshavan et al. | 51/309 |

Primary Examiner—Patrick J. Ryan
Assistant Examiner—N. Edwards
Attorney, Agent, or Firm—Larry R. Meenan; John J. Prizzi

[57] ABSTRACT

An arc hardfacing rod including a tubular member, a filler material, an insulating coating and a plurality of discrete metal carbide particles set within the insulating coating such that a surface of a portion of the metal carbide particles is uncovered. The filler carbide particles include tungsten carbide particles, titanium carbide particles, tantalum carbide particles, niobium carbide particles, zirconium carbide particles, vanadium carbide particles, hafnium carbide particles, molybdenum carbide particles, chromium carbide particles, silicon carbide particles and boron carbide particles, cemented composites and mixtures thereof. Adhered to the exterior surface of the tubular member is an insulating coating including a coating flux and a coating bonding agent. A plurality of discrete metal carbide particles are set within the insulating coating such that a surface of a portion of the metal carbide particles is uncovered. The metal carbide particles may be of the same composition as the filler carbide particles forming the filler material or the metal carbide particles may be macrocrystalline tungsten carbide particles, cast tungsten carbide particles, crushed sintered cemented tungsten carbide particles or pelletized cemented tungsten carbide particles, and mixtures thereof.

25 Claims, 5 Drawing Sheets

ARC HARDFACING ROD

FIELD OF THE INVENTION

This invention relates to arc hardfacing rods. More particularly this invention relates to arc hardfacing rods which are useful for depositing hard carbide particles on a base material to produce cutting and/or wearing surfaces and a method of making the arc hardfacing rods.

BACKGROUND OF THE INVENTION

Hardfacing rods are widely used for applying a hard surface, also known as a hardfacing, to a base material to protect the base material from abrasive wear and/or to provide a cutting surface thereon. These base materials are typically of a metal material and may be in the form of tools such as hand and power shovels, cutting tools, hammers, agricultural tools, down hole drill bits, etc.

A widely used type of such hardfacing rod incorporates hard particles, such as refractory carbides within a tubular metal rod. The hard particles are deposited from the hardfacing rods by thermal diffusion through the use of a high temperature gas flame, an electric arc, or a similar source of heat. Depending on the source of heat, the tube is characterized as a welding rod or as both a welding rod and an electrode. (For example, gas flame and electric arc, respectively.)

It will be appreciated that it is generally advantageous to minimize the amount of carbide particles dissolved in the weld pool and to suspend the carbide particles uniformly in the weld pool. Carbide particles that are undissolved and uniformly dispersed in the weld pool better perform their intended function of cutting and/or resisting abrasion. Accordingly, hardfacing rods should deposit as high a carbide content as possible to produce long wearing and/or cutting surfaces.

Various types of hardfacing rods are known. U.S. Pat. No. 2,280,223 discloses a coated hardfacing rod having a core of a hard alloy metal. The hard alloy metal core may be a high carbon containing cobalt and chromium or tungsten or both which may contain additions of nickel, molybdenum, tantalum, titanium, iron and cesium. The coating contains metal carbides. U.S. Pat. No. 2,507,195 discloses a hardfacing rod including an austenitic manganese steel in combination with carbide particles. The carbide particles may be formed as a coating and/or core on or in the rod. The austenitic manganese steel is added for its toughness and cold work properties. U.S. Pat. No. 3,023,130 discloses either a hardfacing rod of a stainless steel matrix composition having carbide particles within a flux coating on the outside of a rod or carbide particles within a flux coating within the rod.

Although there are various types of hardfacing rods known, further improvements on hardfacing rods are desired. One aspect of the present invention is to provide tubular arc hardfacing rods which are useful in depositing carbide containing wearing and/or cutting surfaces which are simple and economical to manufacture. It is an additional aspect of the present invention to provide arc hardfacing rods which will deposit a uniform dispersion of carbide particles within a weld pool. It is a further aspect of the present invention to prevent excess solutioning of carbides and formation of brittle deposits. Still another aspect of the present invention is to produce arc hardfacing rods which will deposit a high proportion of carbide particles in a weld pool relative to the carbide particles comprising the rods.

A further aspect of the present invention is to provide commercially acceptable arc hardfacing rods in which there is a minimum interference due to slag under the arc, the smoke level is low enough to afford good visibility, the spatter level is low enough so that very little metal is lost to the air or other sections of the base material, there is minimum porosity in the deposit and the deposit is easily controlled by the welder.

SUMMARY OF THE INVENTION

Briefly, according to this invention there is provided an arc hardfacing rod comprising a tubular member, a filler material, an insulating coating and a plurality of discrete metal carbide particles set within the insulating coating such that a surface of a portion of the carbide particles is exposed.

The filler material is retained within the metal tubular member. The filler material includes a filler flux, a bonding agent and filler carbide particles selected from the group consisting of tungsten carbide particles, titanium carbide particles, tantalum carbide particles, niobium carbide particles, zirconium carbide particles, vanadium carbide particles, hafnium carbide particles, molybdenum carbide particles, chromium carbide particles, silicon carbide particles and boron carbide particles, cemented composites and mixtures thereof.

An insulating coating is adhered to the exterior of the tubular member. The insulating coating includes a coating flux and a coating bonding agent.

Set within the insulating coating is a plurality of discrete metal carbide particles such that a surface of a portion of the metal carbide particles is uncovered. The metal carbide particles may be of the same composition as the filler carbide particles forming the filler material or the metal carbide particles may be crushed sintered cemented tungsten carbide particles or pelletized cemented tungsten carbide particles. In a preferred embodiment the metal carbide particles set within the insulating coating are cast tungsten carbide particles or macrocrystalline tungsten carbide particles.

The metal carbide particles may be of a size from about 74 $\mu$m to 840 $\mu$m and, preferably, from 105 $\mu$m to 840 $\mu$m.

BRIEF DESCRIPTION OF THE DRAWINGS

Further features and other aspects and advantages of this invention will become clear from the following detailed description made with reference to the drawings in which.

DESCRIPTION OF THE PREFERRED EMBODIMENTS

Figure 1:
FIG. 1 is a photomicrograph of a portion of a weld produced in accordance with Example 1 (33x)

An arc hardfacing rod in accordance with the present invention includes a tubular member, a filler material, an insulating coating and a plurality of metal carbide particles set within the insulating coating such that a surface of a portion of the metal carbide particles is uncovered. The filler material may include a filler flux, a bonding agent and filler carbide particles. The insulating coating includes a coating flux and a coating bonding agent.

Applicants have found that by adding filler carbide to the filler material and setting a plurality of discrete metal carbide particles within the insulating coating such that a surface of a portion of the metal carbide particles is uncovered, the survivability of the carbide is greatly increased over known arc hardfacing rods. It is believed that by setting a plurality of discrete metal carbide particles within the insulating coating such that a surface of a portion of the metal carbide particles is uncovered the carbide survivability is increased by introducing into the weld pool additional carbide particles to absorb the heat of the pool and thereby increase the freeze rate of the pool, by increasing the bulk of carbide available for deposition in the weld pool and by insulating or isolating the metal carbide particles set within the insulating coating directly from the extreme heat of the arc. It will be appreciated that increased carbide survivability within the weld pool during arc hardfacing deposition increases the mechanical and thermal toughness and improves the wear resistance of the base material.

The tubular member of the arc hardfacing rod in accordance with the present invention is generally cylindrical in shape and filled with the filler material. The tubular member is formed of a mild or low carbon steel such as SAE 1008 or SAE 1010 steel. The ends of the tubular member may be crimped or otherwise sealed to prevent the filler material from shaking out during storage and handling.

The filler material includes a filler flux, a bonding agent and filler carbide particles. The filler flux, bonding agent and filler carbide particles are thoroughly mixed together along with other suitable conventional ingredients and then compacted within the tubular member.

The filler flux is added to protect weld pools from the atmosphere, deoxidize and desulfurize weld metal, add alloying elements and keep spatter down. The filler flux also assists in removing oxides and scale from the base material to which the hardfacing is applied. The filler flux composition according to the present invention is employed in relatively small amounts in the filler material and may vary depending upon the particular application and/or the form of filler carbide within the filler material.

The filler flux may include a powdered alloy composed of a ferrosilicon or an alloy composed of manganese, silicon and iron, known as Mansilex, a trademark of Chemalloy, or in a preferred embodiment, silicomanganese. The nominal composition of the silicomanganese is 65-68 wt% manganese, 15-18 wt% silicon, a maximum of 2 wt% carbon, a maximum of 0.05 wt% sulfur, a maximum of 0.35 wt% phosphorous and the balance iron. Potassium oxalate may be added to the filler flux to control slag viscosity. A carbonaceous material may also be added such that during hardfacing the carbonaceous material produces a shielding gas to protect the weld pool. Suitable carbonaceous materials include sugar and carbon black. Acceptable forms of carbon black are obtainable from J. M. Huber, Corp. and Dixon Graphite Co., under the trademarks Thermax and Dixon Carbon Grade 1181, respectively. Boron or borax glass may also be added to help form slag and control slag viscosity. Borax glass is an anhydrous sodium tetraborate such as that obtainable from Kerr McGee under the trademark Pyrobor.

It will be appreciated that the filler flux may include a small amount of other ingredients such as deoxidizers and alloying agents, such as niobium and copper and the like in order to vary the deposit form.

Forming a part of the filler material is a bonding agent. The bonding agent acts to solidify the filler material within the rod. Suitable bonding agents include phenolic resins such as a phenolic resin binder sold as Resin 29217 obtainable from Occidental Chemical Corp. and such other bonding agents as potassium silicate, sugar, Bakelite, Durite SD-3170 and Diapene. Diapene is a trademark of Alkaril Chemicals for a borophosphate mixture. Bakelite is a trademark of Leco Corporation for a phenolic thermosetting powder obtained by the condensation of formaldehyde with phenols. Durite is a trademark of Borden Chemical for a phenol-formaldehyde plastic.

Blended with the filler flux and bonding agent are carbide particles of a suitable size. The filler carbide particles may include tungsten carbide particles, titanium carbide particles, tantalum carbide particles, niobium carbide particles, zirconium carbide particles, vanadium carbide particles, hafnium carbide particles, molybdenum carbide particles, chromium carbide particles, silicon carbide particles and boron carbide particles, cemented composites and mixtures thereof. The binder of the cemented composites may be cobalt, nickel, iron and the like as known to one skilled in the art.

Depending upon the intended application for the arc hardfacing rod, the carbide particles in the form of cemented tungsten carbide particles may be of a size less than or equal to 15 $\mu$m and uncemented tungsten carbide particles may be of a size greater than 15 $\mu$m. Uncemented tungsten carbide particles of a size ranging from at least 15 $\mu$m up to about 840 $\mu$m are known as macrocrystalline tungsten carbide particles. Macrocrystalline tungsten carbide particles are generally fully carburized and densified crystal particles. Macrocrystalline tungsten carbide particles may be manufactured by the alumino thermit process or by the menstruum process.

The menstruum process is a process for the formation of tungsten carbide within a melt of auxiliary metals. The process requires the addition of external energy which often is supplied by the use of inductive coils. For a more detailed description of the menstruum process reference is made to Eloff, Production of Metal Carbides, 7 Metals Handbook, Ninth Edition 156-159 (1984), incorporated herein by reference. The alumino thermit process is a self sustaining reaction in which macrocrystalline tungsten carbide is produced from a blend of tungsten ore concentrates. For a more detailed understanding of the production of macrocrystalline tungsten carbide reference is made to U.S. Pat. Nos. 3,379,503 and 4,834,963 assigned to Kennametal Inc. and incorporated herein by reference.

A suitable filler material for a rod containing macrocrystalline tungsten carbide particles contains approximately the following constituents in weight percent:

TABLE 1

| Filler Material | Preferred Wt % | Range Wt % |
| --- | --- | --- |
| silicomanganese | 3.5 | 0.5-7.0 |
| phenolic resin | 0.4 | 0-2.0 |
| potassium oxalate | 0.5 | 0-1.0 |
| macrocrystalline WC | remainder | |

Similarly, a filler material for a rod containing a mix of macrocrystalline tungsten carbide particles and crushed sintered cemented metal carbide contains approximately the following constituents in weight percent:

TABLE 2

| Filler Material | Preferred Wt % | Range Wt % |
| --- | --- | --- |
| silicomanganese | 1.57 | 0.5-7.0 |
| potassium oxalate | 0.25 | 0-1.0 |
| borax glass | 0.59 | 0-1.0 |
| carbon black | 0.43 | 0-2.0 |
| sugar | 1.60 | .25-3.0 |
| niobium | 0.50 | 0-2.0 |
| macrocrystalline WC | 70.57 | 65-75 |
| crushed cemented carbide | 24.49 | 20-30 |

Similarly, a filler material for a rod containing cast carbide particles contains approximately the following constituents in weight percent:

TABLE 3

| Filler Material | Preferred Wt % | Range Wt % |
| --- | --- | --- |
| silicomanganese | 3.24 | 0.5-7.0 |
| potassium oxalate | 0.50 | 0-1.0 |
| niobium | 0.50 | 0-2.0 |
| phenolic resin | 0.10 | 0-2.0 |
| copper | 0.25 | 0-1.0 |
| cast carbide | | remainder |

Adhered to the exterior surface of the tubular member of the hardfacing rod is an insulating coating containing a coating flux and a coating bonding agent.

The insulating coating serves a number of purposes such as bonding the carbide particles to the exterior surface of the rod, preventing the deterioration of the filler material during weld deposition, providing good surface wetting and weldability properties to the hardfacing rod, facilitating the formation of intermetallic carbides and supplying additional carbide forming agents.

In a preferred embodiment of the present invention, the insulating coating contains approximately the following constituents in weight percent:

TABLE 4

| Insulating Coating | Preferred Wt % | Range Wt % |
| --- | --- | --- |
| ferromanganese | 39.9 | 30-50 |
| kaolin clay | 34.2 | 25-45 |
| dixon carbon | 19.0 | 10-30 |
| potassium oxalate | 1.9 | 0-5 |
| potassium silicate | 5.0 | 0-15 |

The nominal composition of the ferromanganese is approximately 7 wt% carbon, a minimum of 78 wt% manganese and a maximum of 1 wt% silicon. A carbonaceous material may also be added such that during hardfacing the carbonaceous material produces a shielding gas to protect the weld pool. Suitable carbonaceous materials include a carbon material sold under the trademark Dixon Carbon Grade 1181. Potassium oxalate is used as an arc stabilizer and to lower the melting point of the slag which may be formed during hardfacing. It will be appreciated that other suitable compounds may also be used to lower the melting point of the slag formed during hardfacing such as calcium fluoride and calcium florosilicate.

The coating bonding agent is kaolin clay. Kaolin clay, obtainable from Georgia Kaolin Co., Inc., is a white-burning aluminum silicate which has a high fusion point and adds body to the flux and acts as a refractory binder material.

Set within the insulating coating are a plurality of discrete metal carbide particles. The metal carbide particles project from the insulating coating such that a surface of a portion of the metal carbide particles is uncovered and free of the insulating coating. The metal carbide particles contribute to the mechanical and thermal toughness and abrasion resistant properties of the weld. The metal carbide particles may be of the same composition as the filler carbide particles forming the filler material as previously described or the metal carbide particles may be cast tungsten carbide particles, pelletized cemented tungsten carbide particles or crushed sintered cemented tungsten carbide particles or mixtures thereof.

Cast tungsten carbide particles may be manufactured by melting pure tungsten powder with sufficient carbon to obtain the desired percent tungsten carbide. It is then cast into suitable shapes in chilled molds, preferably by the centrifugal casting process in order to obtain the densest possible product. The resultant castings are then crushed into graded sizes. The cast carbide may also be of a spherical form. The cast carbide sizes may then be blended as desired for application on the exterior surface of the tubular member.

It will be understood by those skilled in the art that the hardfacing rods of the present invention may be manufactured by a number of methods known in the art. For example, the tube may be first preformed, filled by gravity with the filler material, the ends of the tube crimped so that the filler is retained within the tube and then the coating may be applied on the exterior surface of the tube by either a standard extrusion method or by dipping.

In a preferred method of making the present invention, the filler material is charged into the tubular member while the tubular member is being formed on a rolling mill from a generally flat strip of mild steel. The first operation of this process forms the strip into a generally U-shape. The U-shaped strip passes underneath a filling station where it receives the charge of filler material and is immediately closed into a tube by crimping and closing rolls. A final pair of rolls then tighten the tube down to the desired diameter after which the filled tube passes through a cut off operation which cuts and closes the ends of the tube at any desired length.

The hardfacing rods are then coated with the insulating coating by dipping the rod in a bath of the insulating coating and then sprinkling or rolling the metal carbide particles onto the wetted rod. It will be appreciated that by placing the metal carbide particles on the rod after it has been coated, a surface of at least a portion of the metal carbide particles is uncovered such that the coating flux acts to insulate the metal carbide particles from the high temperature arc thereby increasing the amount of carbide surviving in the weld pool.

The invention will be further clarified by a consideration of the following examples, which are intended to be purely exemplary of the use of the invention. Unless indicated to the contrary in the following examples, the filler material of each hardfacing welding rod included macrocrystalline tungsten carbide particles and crushed cemented tungsten carbide particles and the filler flux composition as previously described in Table 2. Furthermore, unless indicated to the contrary, the coating composition included the preferred flux coating and various metal carbide particles as further described in each Example.

The approximate proportion of the filler material, tubular member, insulating coating and metal carbide particles by weight percent comprising the hardfacing rod are as shown in Table 5.

TABLE 5

| Component | Preferred wt % | Range wt % |
| --- | --- | --- |
| filler material | 45 | 40–50 |
| tubular member | 30 | 25–35 |
| insulating coating | 4 | 2–6 |
| metal carbide particles | 21 | 19–23 |

The performance of each hardfacing rod was then evaluated by an American Welding Society Certified Welding Inspector by forming a weld pool or deposit using each hardfacing welding rod employing a DC+ reverse polarity @115 amps on a Lincoln IdealArc model TM-300 AC/DC electric arc hardfacing unit. Each rod was placed at approximately 90 degrees to a 2½ inch by 1 inch mild steel coupon with a travel speed of 2.3 inches per minute. Both travel speed and heat input were optimized for a KT-150 rod (Example 1) and remained constant throughout the remaining Examples (Examples 2–10) so as to observe the effects of the present invention. Optimization of travel speed or heat input was not attempted for any of the other rods presented in the Examples below (Examples 2–10).

Each hardfacing rod and weld deposit was then evaluated for carbide distribution and survivability (carbide), interference due to slag under the arc (slag level), the level of visibility afforded the welder (smoke level), amount of metal lost to the air or other sections of the base material (spatter level), the level of control of the weld deposit by the welder (weldability), appearance of the finish weld (appearance) and wear resistance and hardness. For purposes of evaluation, weldability, appearance, wear resistance and hardness were ranked in order of performance, 1 being the best and 10 being the worst. Similarly, carbide distribution and survivability (carbide), slag level, smoke level and spatter level were evaluated by relative comparison to the performance of the KT-150 rod of Example 1.

EXAMPLE 1

A standard KT-150 hardfacing welding rod of 3/16 in. diameter was obtained from Kennametal Inc. A single flux coating was applied to the hardfacing rod. A hardfacing surface was then applied to a mild steel coupon of approximately 2½ inches by 1 inch.

As shown in FIG. 1, the resultant weld pool formed during deposition exhibited little carbide survival in the weld pool. The rod ran well with low to medium spatter, low slag present in the finished weld and medium smoke generation.

The wear resistance of the finished weld was measured by a Riley-Stoker wear tester ASTM designation B 611-85. The abrasion resistance was determined to be approximately $164.28 \times 10^{-5}$ cm$^3$/100 reV. Similarly, the hardness of the weld pool was determined by use of a Rockwell hardness tester in accordance with ASTM Designation B 294-86. The hardness of the hardfaced metal sample was approximately 58.4 Rc.

EXAMPLE 2

A hardfacing welding rod of 3/16 in. diameter was produced as previously described herein. A hardfacing surface was then applied to a mild steel coupon of approximately 2½ inches by 1 inch. The coating composition on the hardfacing rod consisted of a mix of approximately 10 wt% vanadium carbide, 37 wt% macrocrystalline tungsten carbide, 15 wt% tungsten and 18 wt% molybdenum carbide intermixed with the preferred insulating coating.

Figure 2:
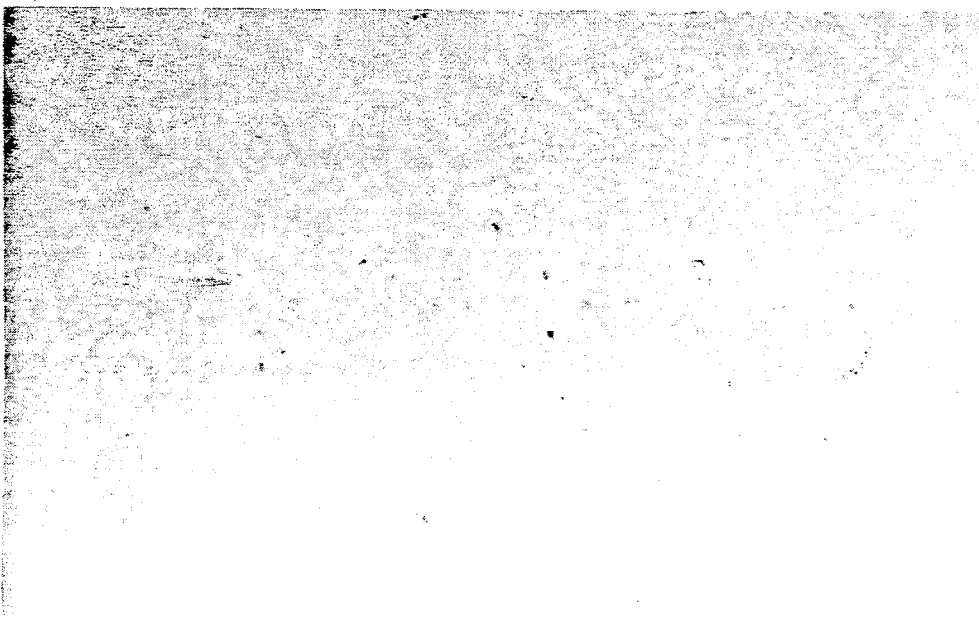
FIG. 2 is a photomicrograph of a portion of a weld produced in accordance with Example 2 (35x)

The VC rod was difficult to run at the beginning of the weld getting better as the weld progressed and the rod heated up after approximately ½ inch of travel. There was low spatter, low slag present in the finished weld and medium smoke generated. As shown in FIG. 2, the resultant weld pool formed during deposition exhibited substantially the same carbide survival and distribution as the standard KT 150 rod of Example 1.

The wear resistance of the finished weld was measured by a Riley-Stoker wear tester ASTM designation B 611-85. The abrasion resistance was determined to be approximately $209.41 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 54.6 Rc.

EXAMPLE 3

A KT-150 hardfacing welding rod 3/16 in. diameter was obtained from Kennametal Inc. A double flux coating excluding carbide particles was applied to the exterior of the hardfacing rod to determine the effect of the flux coating composition on welding performance. A hardfacing surface was then applied to a mild steel coupon of approximately 2½ inches by 1 inch.

Figure 3:
FIG. 3 is a photomicrograph of a portion of a weld produced in accordance with Example 3 (22x)

As shown in FIG. 3, the resultant weld pool formed during deposition exhibited substantially the same carbide survival and distribution as the standard KT 150 rod of Example 1. Thus, it is believed that carbide distribution and survivability exhibited by Examples 2 and 4–10 are not solely attributable to excess flux.

The rod welded hotter than the conventional KT-150 rod with better control over the weld deposit. Welding slag was evident running ahead of the deposit making the welding more difficult than the single coated KT-150 rod. The finished weld did not exhibit excess slag although slag was present in greater amounts than the single coated KT-150 rod. Spatter was low to medium with heavy smoke generated.

The wear resistance of the finished weld was measured by a Riley-Stoker wear tester ASTM designation 611-85. The abrasion resistance was determined to be approximately $180.10 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 59.6 Rc.

EXAMPLE 4

A hardfacing welding rod of 3/16 in. diameter was produced as previously described herein. A hard-facing surface was then applied to a mild steel coupon of approximately 2½ inches by 1 inch. The coating composition on the hardfacing rod consisted of a mix of pelletized cemented tungsten carbide particles of approximately 590 μm intermixed with the preferred insulating coating.

Figure 4:
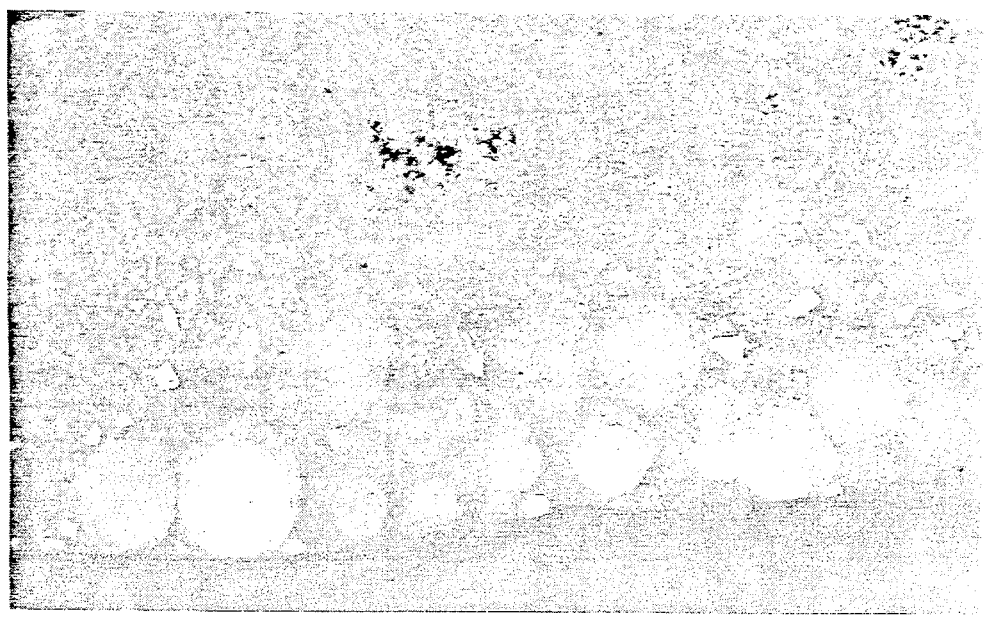
FIG. 4 is a photomicrograph of a portion of a weld produced in accordance with Example 4 (35x)

As shown in FIG. 4, the resultant weld pool formed during deposition exhibited excellent carbide survival and distribution. The rod initially performed poorly during welding but after approximately ¼ inch of welding the rod performed very well. The resultant weld pool formed during deposition exhibited excellent carbide distribution and survivability. Furthermore, there was no evidence of slag in either the weld pool or the finished weld with medium to heavy smoke and low spatter.

The wear resistance of the finished weld was measured by a Riley-Stoker wear tester ASTM designation B 611-85. The abrasion resistance was determined to be approximately $182.79 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 66.0 Rc.

EXAMPLE 5

A hardfacing welding rod of 3/16 in. diameter was produced as previously described herein. A hardfacing surface was then applied to a mild steel coupon of approximately 2½ inches by 1 inch. The coating composition on the hardfacing rod consisted of a mix of crushed tungsten carbide particles of a size from 177 μm to 420 μm intermixed with the preferred insulating coating.

Figure 5:
FIG. 5 is a photomicrograph of a portion of a weld produced in accordance with Example 5 (35x)

As shown in FIG. 5, the resultant weld pool formed during deposition exhibited excellent carbide survivability and distribution. The rod started very hard and only improved slightly over the life of the weld. There was little slag with the coating tending to outlive the filler material of the rod in the electric arc. As a result the crushed tungsten carbide tended to short the arc and fall into the weld pool. Spatter was low and smoke was medium.

The wear resistance of the finished weld was measured by a Riley-Stoker wear tester ASTM designation B 611-85. The abrasion resistance was determined to be approximately $141.38 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 63.4 Rc.

EXAMPLE 6

A hardfacing welding rod of 3/16 in. diameter was produced as previously described herein. A hardfacing surface was then applied to a mild steel coupon of approximately 2½ inches by 1 inch. The coating composition on the hardfacing rod consisted of a mix of crushed tungsten carbide particles of a size from 74 μm to 177 μm intermixed with the preferred insulating coating.

Figure 6:
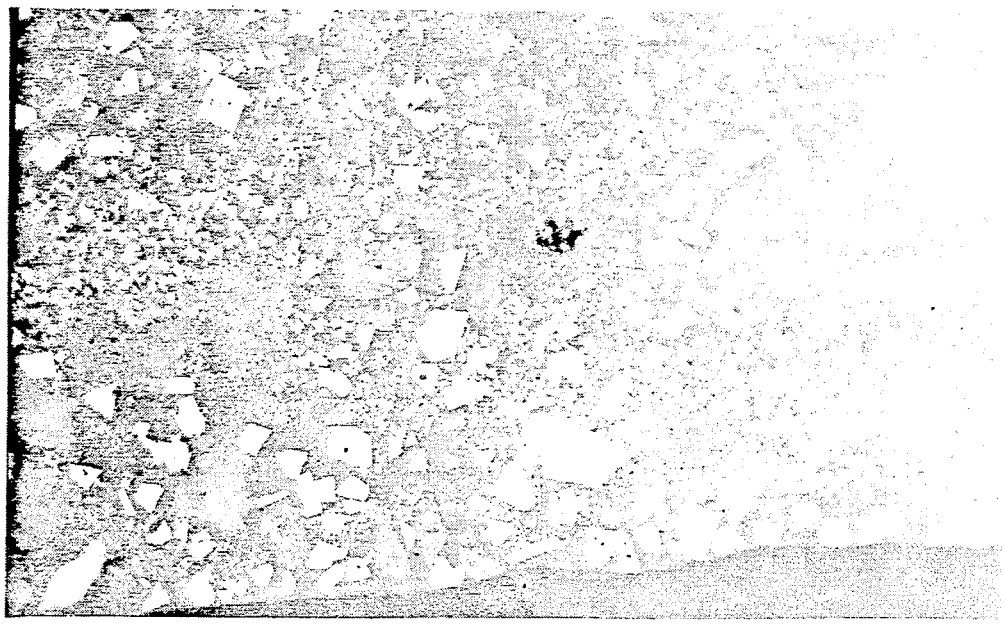
FIG. 6 is a photomicrograph of a portion of a weld produced in accordance with Example 6 (35x)

As shown in FIG. 6, the resultant weld pool formed during deposition exhibited excellent carbide survivability and distribution. The rod started very hard but improved thereafter. The flux came off the rod in a uniform manner mixing well with the filler material melt. There was no slag present, virtually no spatter and medium to heavy smoke.

The wear resistance of the finished weld was measured by a Riley-Stoker wear tester ASTM designation B 611-85. The abrasion resistance was determined to be approximately $157.28 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 64.7 Rc.

EXAMPLE 7

A hardfacing welding rod of 3/16 in. diameter was produced as previously described herein. A hard-facing surface was then applied to a mild steel coupon of approximately 2½ inches by 1 inch. The coating composition on the hardfacing rod consisted of a mix of cast carbide particles of a size from 177 μm to 420 μm intermixed with the preferred insulating coating.

Figure 7:
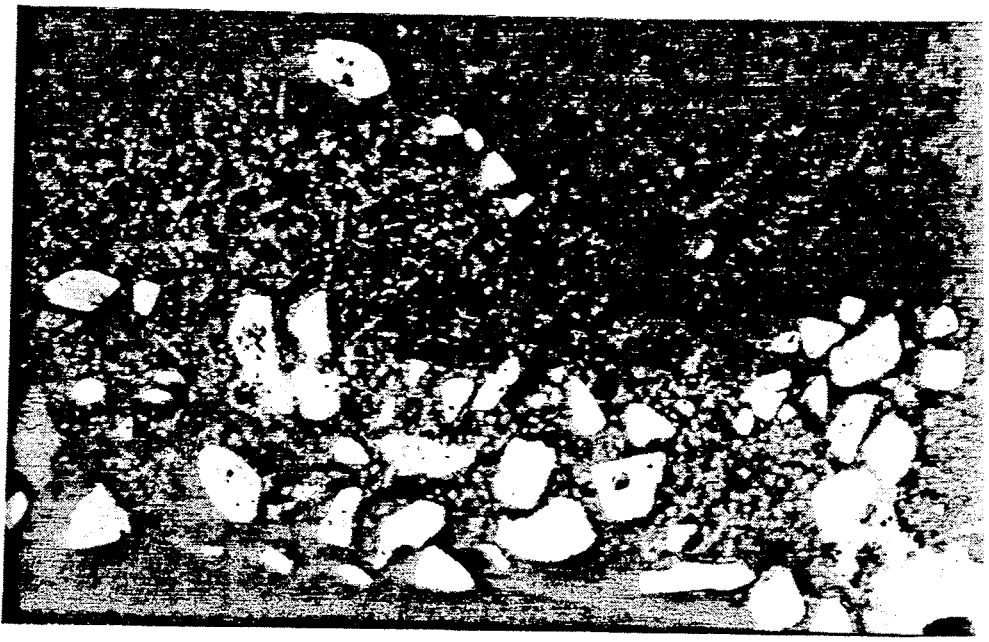
FIG. 7 is a photomicrograph of a portion of a weld produced in accordance with Example 7 (43x)

As shown in FIG. 7, the resultant weld pool formed during deposition exhibited excellent carbide distribution and survivability. There was a small amount of slag present in the weld pool but very little on the finished weld. There was little spatter and heavy smoke.

The wear resistance of the finished weld was measured by a Riley-Stoker wear tester ASTM designation B 611-85. The abrasion resistance was determined to be approximately $139.37 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 64.1 Rc.

EXAMPLE 8

A hardfacing welding rod of 3/16 in. diameter was produced as previously described herein. A hard-facing surface was then applied to a mild steel coupon of approximately 2 ½ inches by 1 inch. The coating composition on the hardfacing rod consisted of a mix of cast carbide particles of a size from 74 μm to 177 μm intermixed with the preferred insulating coating.

Figure 8:
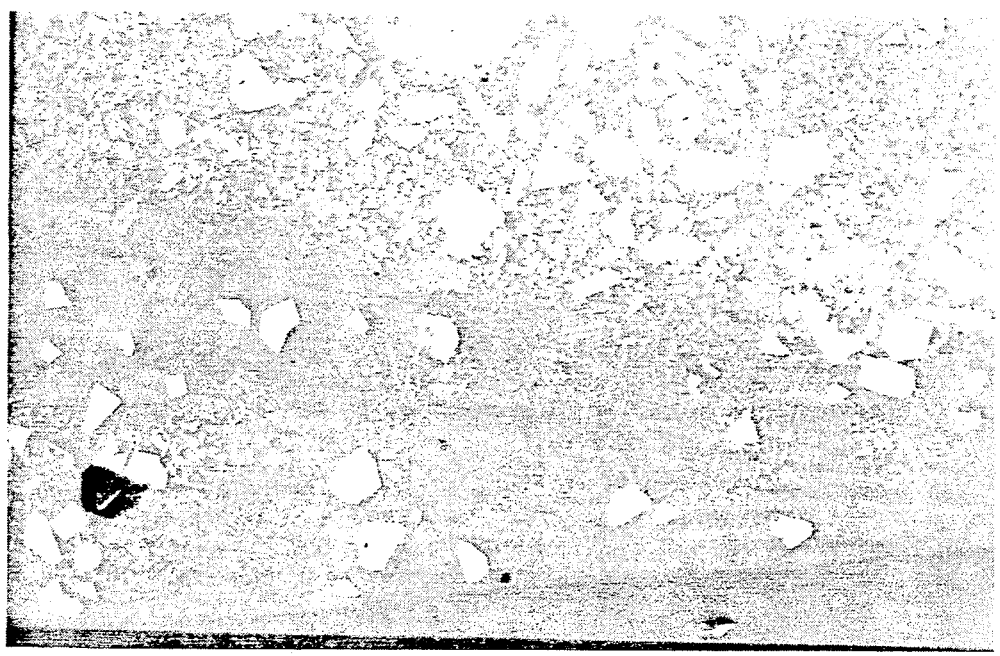
FIG. 8 is a photomicrograph of a portion of a weld produced in accordance with Example 8 (30x)

As shown in FIG. 8, the resultant weld pool formed during deposition exhibited excellent carbide survival and distribution within the weld. Furthermore, there was a medium amount of slag present in the weld pool with a small amount being present in the finished weld. This slag may have resulted from a small amount of the coating admixing with the weld pool. There was no splatter and medium to heavy smoke.

The wear resistance of the finished weld was measured by a Riley-Stoker wear tester ASTM designation B 611-85. The abrasion resistance was determined to be approximately $168.66'10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 63.0 Rc.

EXAMPLE 9

A hardfacing welding rod of 3/16 in. diameter was produced as previously described herein. A hardfacing surface was then applied to a mild steel coupon of a size approximately 2½ inches by 1 inch. The coating composition on the hardfacing rod consisted of a mix of macrocrystalline tungsten carbide particles of a size from 177 μm to 420 μm intermixed with the preferred insulating coating.

Figure 9:
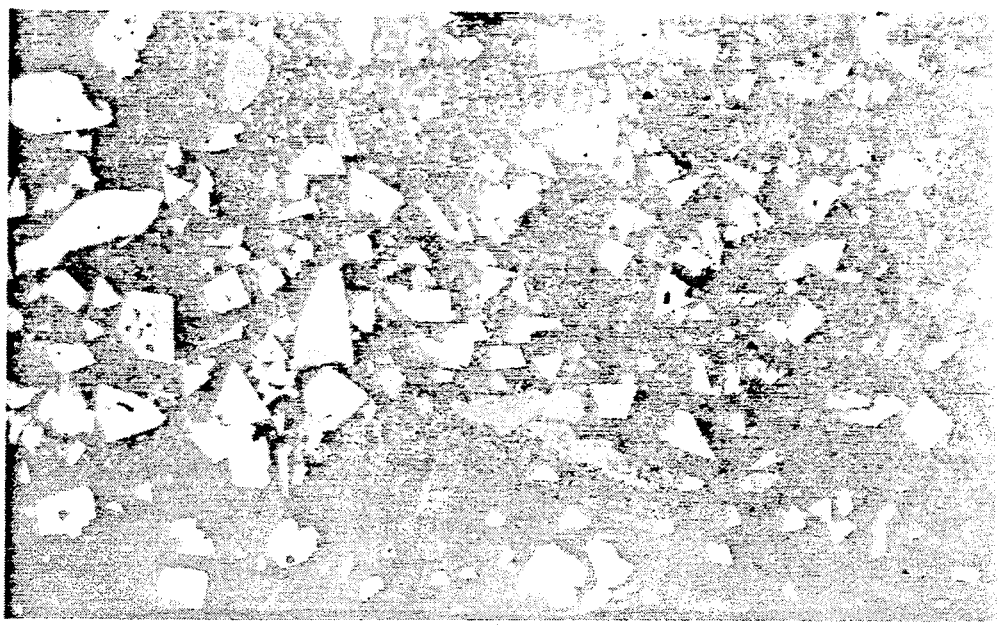
FIG. 9 is a photomicrograph of a portion of a weld produced in accordance with Example 9 (35x)

As shown in FIG. 9, the resultant weld pool formed during deposition exhibited excellent carbide distribution and survivability. Furthermore, there was no evidence of slag in either the weld pool or the finished weld with little spatter and medium smoke.

The wear resistance of the finished weld was measured by a Riley-Stoker wear tester ASTM designation B 611-85. The abrasion resistance was determined to be approximately $154.12 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 63.2 Rc.

EXAMPLE 10

A hardfacing welding rod of 3/16 in. diameter was produced as previously described herein. A hardfacing surface was then applied to a mild steel coupon of approximately 2½ inches by 1 inch. The coating composition on the hardfacing rod consisted of a mix of macrocrystalline tungsten carbide particles of a size from 74 μm to 177 μm intermixed with the preferred insulating coating.

Figure 10:
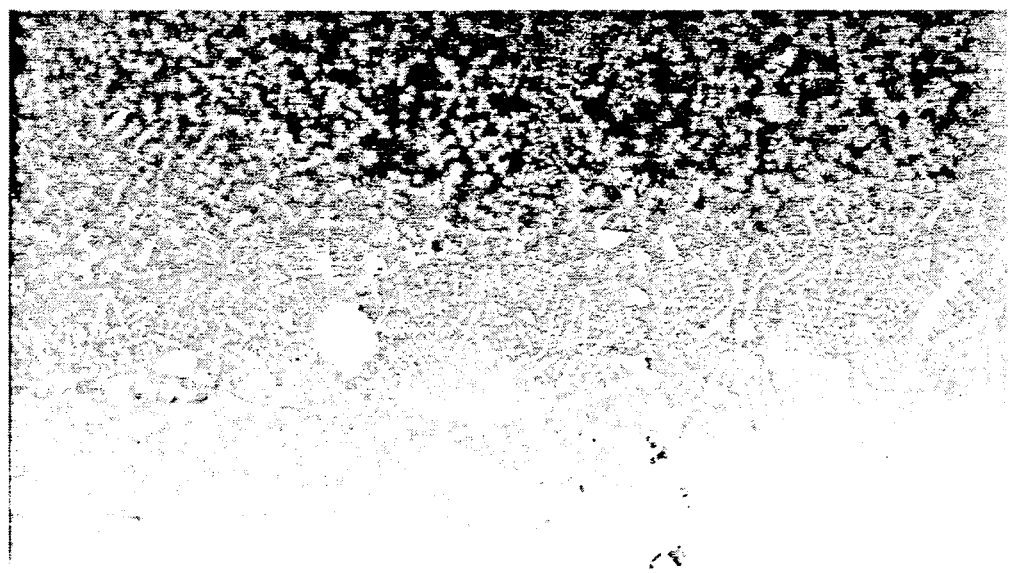
FIG. 10 is a photomicrograph of a portion of a weld produced in accordance with Example 10 (35x).

Although the rod exhibited acceptable welding properties, the filler material melted before the coating causing some drop off of the coating into the weld pool disrupting the weld procedure. It is believed that this weld abnormality may be corrected by adjusting the travel speed and/or the heat input as required. As shown in FIG. 10, the resultant weld pool formed during deposition also exhibited excellent carbide distribution and survivability. Furthermore, there was little evidence of slag in either the weld pool or the finished weld with little spatter and medium to heavy smoke.

The wear resistance of the finished weld was measured by a Riley-Stoker wear tester ASTM designation B 611-85. The abrasion resistance was determined to be approximately $150.87 \times 10^{-5}$ cm$^3$/100 rev. Similarly, the hardness of the weld pool was determined by use of a Rockwell hardness tester in accordance with ASTM Designation B 294-86. The hardness of the hardfaced metal sample was approximately 62.9 Rc.

The results of the weld performance of Examples 1–10 are compiled in tabular form in Table 6 below:

TABLE 6

| EXAMPLE | ROD | CARBIDE | SLAG LEVEL | SMOKE LEVEL | SPATTER LEVEL | WELDABILITY RANK (1 BEST) | WEAR RESISTANCE CM$^3$/rev)/ RANK (1 BEST) | HARDNESS Rc/RANK (1 BEST) | APPEARANCE RANK (1 BEST) |
|---|---|---|---|---|---|---|---|---|---|
| 1 | KT-150 | LITTLE | LOW | MEDIUM | LOW-MEDIUM | (5) | 164.28 (6) | 58.4 (9) | (5) |
| 2 | VC | LITTLE | LOW | MEDIUM | LOW | (7) | 209.41 (10) | 54.6 (10) | (7) |
| 3 | KT-150 DOUBLE DIP | LITTLE | LOW | MEDIUM-HEAVY | LOW | (8) | 180.10 (8) | 59.6 (8) | (1) |
| 4 | PELLETIZED WC-Co | EXCELLENT | NONE | MEDIUM-HEAVY | LOW | (6) | 182.79 (9) | 66.0 (1) | (8) |
| 5 | CRUSHED SINTERED WC-Co 177–420 μm | EXCELLENT | LOW | MEDIUM | LOW | (10) | 141.38 (2) | 63.4 (4) | (9) |
| 6 | CRUSHED SINTERED WC-Co 74–177 μm | EXCELLENT | NONE | MEDIUM-HEAVY | NONE-LOW | (9) | 157.28 (5) | 64.7 (2) | (10) |
| 7 | CAST WC 177–420 μm | EXCELLENT | LOW | HEAVY | LOW | (1) | 139.37 (1) | 64.1 (3) | (4) |
| 8 | CAST WC 74–177 μm | EXCELLENT | MEDIUM | MEDIUM-HEAVY | NONE | (3) | 168.66 (7) | 63.0 (6) | (2) |
| 9 | MACRO WC 177–420 μm | EXCELLENT | NONE | MEDIUM | NONE-LOW | (2) | 154.12 (4) | 63.2 (5) | (3) |
| 10 | MACRO WC 74–177 μm | EXCELLENT | NONE-LOW | MEDIUM-HEAVY | NONE-LOW | (4) | 150.87 (3) | 62.9 (7) | (6) |

As shown in Table 6, it is readily apparent that carbide particles forming part of a filler material within a tubular member and forming part of a coating on the tubular member (Examples 4–10) provide a hardfacing of improved wear resistance and hardness as compared to a hardfacing rod as provided in Examples 1, 2 or 3.

As previously indicated, the KT-150 rod was used as the base weld from which all other welds were compared. Both the travel speed and heat input were optimized for a KT-150 rod (Example 1) and remained constant throughout the remaining Examples 2–10 so as to observe the effects of the present invention. Optimization of travel speed or heat input was not attempted for any of the other rods presented in Examples 2–10. Furthermore, because the Riley-Stoker wear resistance measures only one type of wear which a hardfacing deposit may experience, the measurement obtained should not be regarded as indicative of the performance of any particular rod composition under all wear applications.

Based upon the evaluation of the hardfacing rod performances above, it is believed that by optimizing the welding process of each coated rod in accordance with the present invention, the rods tested in Examples 2–10 would weld as good as or better than the standard KT-150 rod as well as resulting in at least as good a finished weld appearance.

The documents, patents and patent applications referred to herein are hereby incorporated by reference.

Having described presently preferred embodiments of the invention, it is to be understood that it may be otherwise embodied within the scope of the appended claims.

What is claimed is:
1. An arc hardfacing rod comprising:
   a tubular member;
   a filler material within said tubular member including a filler flux, a bonding agent and filler carbide parti- cles, said filler carbide particles selected from the group consisting of tungsten carbide particles, titanium carbide particles, tantalum carbide particles, niobium carbide particles, zirconium carbide particles, vanadium carbide particles, hafnium carbide particles, molybdenum carbide particles, chromium carbide particles, silicon carbide particles and boron carbide particles, cemented composites and mixtures thereof;

an insulating coating adhered to an exterior of said tubular member including a coating flux and a coating bonding agent; and a plurality of uncoated discrete metal carbide particles set within said insulating coating so as a surface of a portion of said metal carbide particles is free of said insulating coating sufficient to form a weld pool including interspersed substantially intact carbide particles surrounded by a lessor dendritic eta phase matrix.

2. The hardfacing rod as set forth in claim 1 wherein said metal carbide particles are selected from the group consisting of tungsten carbide particles, cast tungsten carbide particles, crushed sintered cemented tungsten carbide particles and pelletized cemented tungsten carbide particles.

3. The hardfacing rod as set forth in claim 1 wherein said metal carbide particles are of a size from about 74 $\mu$m to 840 $\mu$m.

4. The hardfacing rod as set forth in claim 1 wherein said metal carbide particles are of a size from about 105 $\mu$m to 840 $\mu$m.

5. The hardfacing rod as set forth in claim 1 wherein said metal carbide particles are macrocrystalline tungsten carbide particles of a size from about 105 $\mu$m to 840 $\mu$m.

6. The hardfacing rod as set forth in claim 1 wherein said metal carbide particles are macrocrystalline tungsten carbide particles of a size from about 177 $\mu$m to 420 $\mu$m.

7. The hardfacing rod as set forth in claim 1 wherein said metal carbide particles are cast tungsten carbide particles of a size from about 177 $\mu$m to 420 $\mu$m.

8. The hardfacing rod as set forth in claim 1 wherein said metal carbide particles are cast tungsten carbide particles of a size from about 74 $\mu$m to 177 $\mu$m.

9. The hardfacing rod as set forth in claim 1 wherein said metal carbide particles are crushed sintered cemented tungsten carbide particles of a size from about 177 $\mu$m to 420 $\mu$m.

10. The hardfacing rod as set forth in claim 1 wherein said metal carbide particles are crushed sintered cemented tungsten carbide particles of a size from about 74 $\mu$m to 177 $\mu$m.

11. The hardfacing rod as set forth in claim 2 wherein said filler flux is a silicomanganese based flux.

12. The hardfacing rod as set forth in claim 11 wherein said filler flux includes potassium oxalate.

13. The hardfacing rod as set forth in claim 12 wherein said filler flux includes an alloying agent.

14. The hardfacing rod as set forth in claim 12 wherein said bonding agent is a phenolic resin bonding agent.

15. The hardfacing rod as set forth in claim 14 wherein said filler flux includes niobium and copper.

16. The hardfacing rod as set forth in claim 12 wherein said bonding agent is selected from the group consisting of potassium silicate, sugar, phenol-formaldehyde resin and borophosphate.

17. The hardfacing rod as set forth in claim 16 wherein said filler flux includes niobium.

18. The hardfacing rod as set forth in claim 16 wherein said filler flux includes a carbonaceous material selected from the group consisting of sugar and carbon black.

19. The hardfacing rod as set forth in claim 2 wherein said coating flux is a ferromanganese based flux.

20. The hardfacing rod as set forth in claim 19 wherein said coating flux includes ferromanganese 30-50 wt%, carbonaceous material 10-30 wt%, potassium oxalate 0-5 wt% and potassium silicate 0-15 wt%.

21. The hardfacing rod as set forth in claim 20 wherein said coating bonding agent is kaolin clay.

22. The hardfacing rod as set forth in claim 2 wherein said filler material includes approximately 0.5-7.0 wt% silicomanganese, 0-2.0 wt% phenolic resin binder, 0-1.0 wt% potassium oxalate and the remainder tungsten carbide.

23. The hardfacing rod as set forth in claim 2 wherein said filler material includes approximately 0.5-7.0 wt% silicomanganese, 0-1.0 wt% borax glass, 0-1.0 wt% potassium oxalate, 0-2.0 wt% carbonaceous material, 0.25-3.0 wt% sugar, 0-2.0 wt% niobium, 65-75 wt% tungsten carbide and 20-30 wt% crushed sintered cemented tungsten carbide.

24. The hardfacing rod as set forth in claim 2 wherein said filler material includes approximately 0.5-7.0 wt% silicomanganese, 0-1.0 wt% potassium oxalate, 0-2.0 wt% niobium, 0-2.0 wt% phenolic resin binder, 0-1.0 wt% copper and the remainder cast tungsten carbide.

25. The hardfacing welding rod as set forth in claim 2 wherein said insulating coating comprises approximately 30-50 wt% ferromanganese, 25-45 wt% kaolin clay, 10-30 wt% carbonaceous material, 0-5 wt% potassium oxalate and 0-15 wt% potassium silicate.

* * * * *